(12) United States Patent
Lee et al.

(10) Patent No.: US 11,550,317 B2
(45) Date of Patent: Jan. 10, 2023

(54) APPARATUS AND METHOD FOR CONTROLLING TO ENABLE AUTONOMOUS SYSTEM IN VEHICLE

(71) Applicants: HYUNDAI MOTOR COMPANY, Seoul (KR); KIA MOTORS CORPORATION, Seoul (KR)

(72) Inventors: Dong Hwi Lee, Suwon-si (KR); Su Jung Yoo, Incheon (KR); Jin Su Jeong, Suwon-si (KR); Jae Young Jeon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 87 days.

(21) Appl. No.: 16/376,576

(22) Filed: Apr. 5, 2019

(65) Prior Publication Data
US 2019/0317494 A1   Oct. 17, 2019

Related U.S. Application Data

(60) Provisional application No. 62/655,831, filed on Apr. 11, 2018.

(30) Foreign Application Priority Data

Dec. 17, 2018   (KR) .................. 10-2018-0163249

(51) Int. Cl.
*B60W 50/08*   (2020.01)
*B60W 50/14*   (2020.01)
*G05D 1/00*   (2006.01)

(52) U.S. Cl.
CPC ......... *G05D 1/0061* (2013.01); *B60W 50/082* (2013.01); *B60W 50/14* (2013.01);
(Continued)

(58) Field of Classification Search
CPC .............. G05D 1/0061; G05D 1/0088; G05D 2201/0213; B60W 50/082; B60W 50/14;
(Continued)

(56) References Cited

U.S. PATENT DOCUMENTS 4,361,202 A   11/1982   Minovitch
5,314,037 A   5/1994   Shaw
(Continued)

FOREIGN PATENT DOCUMENTS

DE   198 21 122 A1   6/1999
DE   101 14 187 A1   9/2002
(Continued)

OTHER PUBLICATIONS

English Translation_EP3264211A1 (Year: 2016).*
(Continued)

*Primary Examiner* — Peter D Nolan
*Assistant Examiner* — Ashley L Redhead, Jr.
(74) *Attorney, Agent, or Firm* — Morgan, Lewis & Bockius LLP

(57) ABSTRACT

An apparatus for controlling to enable an autonomous system in a vehicle is provided. The apparatus includes a sensor, an input device configured to receive an input from a driver of the vehicle, an output device configured to output a notification in the vehicle, and a control circuit configured to be electrically connected with the sensor, the input device, and the output device. The control circuit is configured to activate an autonomous control in response to an input of the driver to the input device, detect a critical situation of the vehicle using the sensor, output a notification to transfer a control authority using the output device in response to the detected critical situation, and automatically reactivate the autonomous control when the critical situation is solved after temporarily releasing the autonomous control, when (Continued)

the critical situation corresponds to a critical situation of a specified type.

12 Claims, 6 Drawing Sheets

(52) U.S. Cl.
CPC ..... *G05D 1/0088* (2013.01); *B60W 2050/143* (2013.01); *G05D 2201/0213* (2013.01)

(58) Field of Classification Search
CPC ....... B60W 2050/143; B60W 60/0059; B60W 60/0051; B60W 60/0053; B60W 50/08; B60W 2540/10; B60W 2540/18; B60W 2540/22; B60W 50/10
See application file for complete search history.

(56) References Cited

U.S. PATENT DOCUMENTS

| | | |
|---|---|---|
| 5,521,579 A | 5/1996 | Bernhard |
| 6,055,467 A | 4/2000 | Mehring et al. |
| 6,473,678 B1 | 10/2002 | Satoh et al. |
| 6,842,687 B2 | 1/2005 | Winner et al. |
| 7,363,140 B2 | 4/2008 | Ewerhart et al. |
| 7,821,421 B2 | 10/2010 | Tamir et al. |
| 8,073,595 B2 | 12/2011 | Tabata et al. |
| 8,457,827 B1 | 6/2013 | Ferguson et al. |
| 8,521,352 B1 | 8/2013 | Ferguson et al. |
| 8,798,841 B1 | 8/2014 | Nickolaou et al. |
| 8,874,301 B1 | 10/2014 | Rao et al. |
| 9,014,919 B2 | 4/2015 | Kim |
| 9,079,571 B2 | 7/2015 | Trost et al. |
| 9,134,731 B2 | 9/2015 | Healey et al. |
| 9,315,178 B1 | 4/2016 | Ferguson et al. |
| 9,527,441 B2 | 12/2016 | Matsumura |
| 9,682,708 B2 | 6/2017 | Maruyama |
| 9,682,725 B2 | 6/2017 | Yamaoka |
| 9,874,871 B1 | 1/2018 | Zhu et al. |
| 10,131,356 B2 | 11/2018 | Takae |
| 10,152,883 B2 | 12/2018 | Fujimaki |
| 10,183,668 B2 | 1/2019 | Takae |
| 10,202,123 B2 | 2/2019 | Aoki |
| 10,259,459 B2 | 4/2019 | Takae |
| 10,286,907 B2 | 5/2019 | Nishiguchi et al. |
| 10,324,463 B1 | 6/2019 | Konrardy et al. |
| 10,449,856 B2 | 10/2019 | Kojima |
| 10,449,971 B2 | 10/2019 | Arakawa et al. |
| 10,451,730 B2 | 10/2019 | Talamonti et al. |
| 10,509,406 B2 | 12/2019 | Choi et al. |
| 10,558,213 B2 | 2/2020 | Sato et al. |
| 10,618,523 B1 | 4/2020 | Fields et al. |
| 10,627,813 B2 | 4/2020 | Tsuji et al. |
| 10,663,971 B2 | 5/2020 | Sugawara et al. |
| 10,676,084 B2 | 6/2020 | Fujii |
| 10,689,005 B2 | 6/2020 | Oishi et al. |
| 10,713,952 B2 | 7/2020 | Ogawa et al. |
| 10,814,913 B2 | 10/2020 | Fujii |
| 10,935,974 B1 | 3/2021 | Fields et al. |
| 2003/0163239 A1 | 8/2003 | Winner et al. |
| 2005/0137782 A1 | 6/2005 | Shinada |
| 2005/0228588 A1 | 10/2005 | Braeuchle et al. |
| 2005/0256630 A1 | 11/2005 | Nishira et al. |
| 2006/0009910 A1 | 1/2006 | Ewerhart et al. |
| 2007/0043505 A1 | 2/2007 | Leicht |
| 2007/0255474 A1 | 11/2007 | Hayakawa et al. |
| 2008/0172153 A1 | 7/2008 | Ozaki et al. |
| 2008/0204212 A1 | 8/2008 | Jordan et al. |
| 2009/0005933 A1 | 1/2009 | Tabata et al. |
| 2009/0088925 A1 | 4/2009 | Sugawara et al. |
| 2009/0132125 A1 | 5/2009 | Yonezawa et al. |
| 2009/0171533 A1 | 7/2009 | Kataoka |
| 2009/0194350 A1 | 8/2009 | Rattapon et al. |
| 2009/0299573 A1 | 12/2009 | Thrun et al. |
| 2009/0319113 A1 | 12/2009 | Lee |
| 2010/0010733 A1 | 1/2010 | Krumm |
| 2010/0042282 A1 | 2/2010 | Taguchi et al. |
| 2010/0289632 A1 | 11/2010 | Seder et al. |
| 2011/0169625 A1 | 7/2011 | James et al. |
| 2011/0196592 A1 | 8/2011 | Kashi et al. |
| 2011/0241862 A1 | 10/2011 | Debouk et al. |
| 2011/0251758 A1 | 10/2011 | Kataoka |
| 2011/0293145 A1 | 12/2011 | Nogami et al. |
| 2012/0166032 A1 | 6/2012 | Lee et al. |
| 2012/0283907 A1 | 11/2012 | Lee et al. |
| 2012/0296522 A1 | 11/2012 | Otuka |
| 2013/0063595 A1 | 3/2013 | Niem |
| 2013/0066525 A1 | 3/2013 | Tomik et al. |
| 2013/0226406 A1 | 8/2013 | Ueda et al. |
| 2013/0253793 A1 | 9/2013 | Lee et al. |
| 2014/0074356 A1 | 3/2014 | Bone |
| 2014/0309855 A1 | 10/2014 | Tran |
| 2014/0336896 A1 | 11/2014 | Udaka et al. |
| 2015/0006012 A1 | 1/2015 | Kammel et al. |
| 2015/0006013 A1 | 1/2015 | Wimmer et al. |
| 2015/0019063 A1 | 1/2015 | Lu et al. |
| 2015/0057869 A1 | 2/2015 | Healey et al. |
| 2015/0094899 A1* | 4/2015 | Hackenberg ........ B60W 50/082 701/23 |
| 2015/0148985 A1 | 5/2015 | Jo |
| 2015/0166062 A1 | 6/2015 | Johnson et al. |
| 2015/0204687 A1 | 7/2015 | Yoon et al. |
| 2015/0353082 A1 | 12/2015 | Lee et al. |
| 2015/0355641 A1 | 12/2015 | Choi et al. |
| 2015/0360721 A1 | 12/2015 | Matsuno et al. |
| 2016/0001781 A1 | 1/2016 | Fung et al. |
| 2016/0091897 A1 | 3/2016 | Nilsson et al. |
| 2016/0107682 A1 | 4/2016 | Tan et al. |
| 2016/0107687 A1 | 4/2016 | Yamaoka |
| 2016/0187879 A1 | 6/2016 | Mere et al. |
| 2016/0225261 A1 | 8/2016 | Matsumoto |
| 2016/0250968 A1 | 9/2016 | Shirakata et al. |
| 2016/0272204 A1 | 9/2016 | Takahashi et al. |
| 2016/0288707 A1 | 10/2016 | Matsumura |
| 2016/0297431 A1 | 10/2016 | Eigel et al. |
| 2016/0297447 A1 | 10/2016 | Suzuki |
| 2016/0311464 A1 | 10/2016 | Yamaoka |
| 2016/0339913 A1 | 11/2016 | Yamashita et al. |
| 2016/0349066 A1 | 12/2016 | Chung et al. |
| 2016/0368492 A1 | 12/2016 | Al-Stouhi |
| 2017/0003683 A1 | 1/2017 | Sato et al. |
| 2017/0061799 A1 | 3/2017 | Fujii et al. |
| 2017/0092125 A1 | 3/2017 | Fujimaki |
| 2017/0108865 A1 | 4/2017 | Rohde et al. |
| 2017/0124882 A1 | 5/2017 | Wang |
| 2017/0148327 A1 | 5/2017 | Sim |
| 2017/0171375 A1 | 6/2017 | Kamata |
| 2017/0183007 A1 | 6/2017 | Oh et al. |
| 2017/0197637 A1 | 7/2017 | Yamada et al. |
| 2017/0203763 A1 | 7/2017 | Yamada et al. |
| 2017/0203764 A1 | 7/2017 | Fujiki et al. |
| 2017/0225685 A1 | 8/2017 | Aoki |
| 2017/0240172 A1 | 8/2017 | Nishiguchi |
| 2017/0240186 A1 | 8/2017 | Hatano |
| 2017/0243491 A1 | 8/2017 | Fujii et al. |
| 2017/0291603 A1 | 10/2017 | Nakamura |
| 2017/0308094 A1 | 10/2017 | Abe |
| 2017/0313313 A1 | 11/2017 | Asakura |
| 2017/0315556 A1 | 11/2017 | Mimura |
| 2017/0334460 A1 | 11/2017 | Arakawa et al. |
| 2017/0341652 A1 | 11/2017 | Sugawara et al. |
| 2017/0341653 A1 | 11/2017 | Kubota et al. |
| 2017/0349173 A1 | 12/2017 | Nishiguchi et al. |
| 2017/0349212 A1 | 12/2017 | Oshida et al. |
| 2017/0368936 A1 | 12/2017 | Kojima |
| 2018/0009437 A1 | 1/2018 | Ooba |
| 2018/0029604 A1 | 2/2018 | Niino et al. |
| 2018/0033309 A1 | 2/2018 | Norwood |
| 2018/0037260 A1 | 2/2018 | Otake et al. |
| 2018/0043906 A1 | 2/2018 | Huang |
| 2018/0046185 A1 | 2/2018 | Sato et al. |
| 2018/0050659 A1 | 2/2018 | Coburn |
| 2018/0074497 A1 | 3/2018 | Tsuji et al. |

(56) References Cited

U.S. PATENT DOCUMENTS

| | | |
|---|---|---|
| 2018/0088574 A1 | 3/2018 | Latotzki et al. |
| 2018/0091085 A1 | 3/2018 | Tamagaki et al. |
| 2018/0111628 A1 | 4/2018 | Tamagaki et al. |
| 2018/0154939 A1 | 6/2018 | Aoki |
| 2018/0157038 A1 | 6/2018 | Kabe |
| 2018/0162416 A1 | 6/2018 | Honda et al. |
| 2018/0170370 A1 | 6/2018 | Kataoka |
| 2018/0178713 A1 | 6/2018 | Fujii |
| 2018/0178714 A1 | 6/2018 | Fujii |
| 2018/0178715 A1 | 6/2018 | Fujii |
| 2018/0178716 A1 | 6/2018 | Fujii |
| 2018/0178801 A1 | 6/2018 | Hashimoto et al. |
| 2018/0178802 A1 | 6/2018 | Miyata |
| 2018/0186376 A1* | 7/2018 | Lee .................. B60W 50/14 |
| 2018/0188735 A1 | 7/2018 | Sugawara et al. |
| 2018/0194280 A1 | 7/2018 | Shibata et al. |
| 2018/0197414 A1 | 7/2018 | Oooka |
| 2018/0209801 A1 | 7/2018 | Stentz et al. |
| 2018/0215387 A1 | 8/2018 | Takae |
| 2018/0215388 A1 | 8/2018 | Takae |
| 2018/0215389 A1 | 8/2018 | Takae |
| 2018/0222422 A1 | 8/2018 | Takae |
| 2018/0222423 A1 | 8/2018 | Takae et al. |
| 2018/0237030 A1 | 8/2018 | Jones et al. |
| 2018/0239352 A1 | 8/2018 | Wang et al. |
| 2018/0251155 A1 | 9/2018 | Chan et al. |
| 2018/0257669 A1 | 9/2018 | Makke et al. |
| 2018/0281788 A1 | 10/2018 | Uchida |
| 2018/0290666 A1 | 10/2018 | Ichikawa et al. |
| 2018/0292820 A1 | 10/2018 | Markberger |
| 2018/0297638 A1 | 10/2018 | Fujii |
| 2018/0297639 A1 | 10/2018 | Fujii |
| 2018/0297640 A1 | 10/2018 | Fujii |
| 2018/0339708 A1 | 11/2018 | Geller |
| 2018/0345959 A1 | 12/2018 | Fujii |
| 2018/0345960 A1 | 12/2018 | Fujii |
| 2018/0345964 A1 | 12/2018 | Fujii et al. |
| 2018/0346027 A1 | 12/2018 | Fujii |
| 2018/0348758 A1 | 12/2018 | Nakamura et al. |
| 2018/0350242 A1 | 12/2018 | Fujii |
| 2018/0354519 A1 | 12/2018 | Miyata |
| 2018/0362013 A1 | 12/2018 | Ungermann |
| 2018/0370542 A1 | 12/2018 | Braunagel et al. |
| 2018/0370544 A1 | 12/2018 | Kitagawa |
| 2018/0373250 A1 | 12/2018 | Nakamura et al. |
| 2019/0005823 A1 | 1/2019 | Fujiki et al. |
| 2019/0026918 A1 | 1/2019 | Gomezcaballero et al. |
| 2019/0027040 A1 | 1/2019 | Ogawa et al. |
| 2019/0047469 A1 | 2/2019 | Nishiguchi et al. |
| 2019/0047561 A1 | 2/2019 | Nishiguchi et al. |
| 2019/0049958 A1 | 2/2019 | Liu et al. |
| 2019/0061766 A1 | 2/2019 | Nishiguchi |
| 2019/0071099 A1 | 3/2019 | Nishiguchi |
| 2019/0106108 A1 | 4/2019 | Wienecke et al. |
| 2019/0126923 A1 | 5/2019 | Taie et al. |
| 2019/0126927 A1 | 5/2019 | Uejima |
| 2019/0135290 A1 | 5/2019 | Marden et al. |
| 2019/0155279 A1 | 5/2019 | Tayama |
| 2019/0161117 A1 | 5/2019 | Suzuki |
| 2019/0168754 A1 | 6/2019 | Makled |
| 2019/0185005 A1 | 6/2019 | Fukuda |
| 2019/0196481 A1 | 6/2019 | Tay et al. |
| 2019/0197497 A1 | 6/2019 | Abari et al. |
| 2019/0212443 A1 | 7/2019 | Nomura et al. |
| 2019/0235504 A1 | 8/2019 | Carter et al. |
| 2019/0241158 A1 | 8/2019 | Ghannam et al. |
| 2019/0241198 A1 | 8/2019 | Mori et al. |
| 2019/0250620 A1 | 8/2019 | Huang |
| 2019/0256064 A1 | 8/2019 | Hecker et al. |
| 2019/0263411 A1 | 8/2019 | Saikyo et al. |
| 2019/0265712 A1 | 8/2019 | Satzoda et al. |
| 2019/0279507 A1 | 9/2019 | Oshisaka et al. |
| 2019/0283757 A1 | 9/2019 | Honda et al. |
| 2019/0285726 A1 | 9/2019 | Moto |
| 2019/0291642 A1 | 9/2019 | Chae et al. |
| 2019/0291728 A1 | 9/2019 | Shalev-Shwartz et al. |
| 2019/0302763 A1 | 10/2019 | Kondo et al. |
| 2019/0302768 A1* | 10/2019 | Zhang ................... B60W 50/14 |
| 2019/0315362 A1 | 10/2019 | Um et al. |
| 2019/0317494 A1 | 10/2019 | Lee et al. |
| 2019/0325758 A1 | 10/2019 | Yoshii et al. |
| 2019/0359202 A1 | 11/2019 | Zhu et al. |
| 2019/0391580 A1 | 12/2019 | Di Cairano et al. |
| 2020/0001714 A1 | 1/2020 | Kojima |
| 2020/0049513 A1 | 2/2020 | Ma |
| 2020/0073396 A1 | 3/2020 | Shimizu |
| 2020/0172123 A1 | 6/2020 | Kubota et al. |
| 2020/0180638 A1 | 6/2020 | Kanoh |
| 2020/0189618 A1 | 6/2020 | Ochida et al. |
| 2020/0269747 A1 | 8/2020 | Kusayanagi et al. |
| 2020/0269880 A1 | 8/2020 | Tokita |
| 2020/0301431 A1 | 9/2020 | Matsubara et al. |
| 2020/0307634 A1 | 10/2020 | Yashiro |
| 2020/0312155 A1 | 10/2020 | Kelkar et al. |
| 2020/0339128 A1 | 10/2020 | Kanoh et al. |
| 2020/0391593 A1 | 12/2020 | Lee et al. |
| 2021/0188258 A1 | 6/2021 | Goto et al. |
| 2021/0188262 A1 | 6/2021 | Goto et al. |
| 2021/0188356 A1 | 6/2021 | Goto et al. |

FOREIGN PATENT DOCUMENTS

| | | | |
|---|---|---|---|
| DE | 102004005815 B3 | 6/2005 | |
| DE | 10 2004 048 468 A1 | 4/2006 | |
| DE | 10 2007 005 245 A1 | 11/2007 | |
| DE | 10 2011 016 770 A1 | 11/2011 | |
| DE | 10 2011 016 771 A1 | 10/2012 | |
| DE | 10 2012 001 405 A1 | 11/2012 | |
| DE | 10 2011 109618 A1 | 2/2013 | |
| DE | 10 2012 008090 A1 | 10/2013 | |
| DE | 10 2014 200896 A | 7/2015 | |
| DE | 10 2014 225 680 A1 | 6/2016 | |
| DE | 10 2015 205131 A1 | 9/2016 | |
| DE | 102016202946 A1 | 9/2016 | |
| DE | 102015206969 A1 | 10/2016 | |
| DE | 102015209476 A1 | 11/2016 | |
| DE | 102015219231 A1 | 4/2017 | |
| DE | 10 2016 007187 A1 | 6/2017 | |
| DE | 102015224244 A1 | 6/2017 | |
| DE | 10 2016 215565 A1 | 2/2018 | |
| DE | 10 2016 216134 A1 | 3/2018 | |
| EP | 1074904 A1 | 2/2001 | |
| EP | 1607264 A1 | 12/2005 | |
| EP | 2116984 A1 | 11/2009 | |
| EP | 2657921 A1 | 10/2013 | |
| EP | 2978648 A1 | 2/2016 | |
| EP | 3075618 A2 | 10/2016 | |
| EP | 3239960 A1 | 11/2017 | |
| EP | 3 264 211 A1 | 1/2018 | |
| EP | 3264211 A1 * | 1/2018 | ........... G05D 1/0061 |
| EP | 3284646 A1 | 2/2018 | |
| EP | 3075618 A3 | 5/2018 | |
| EP | 19167267.4 | 8/2021 | |
| JP | 2000-020898 A | 1/2000 | |
| JP | 2000-198458 A | 7/2000 | |
| JP | 2003-025868 A | 1/2003 | |
| JP | 2008-515701 A | 5/2008 | |
| JP | 2009-184554 A | 8/2009 | |
| JP | 2015-066962 A | 4/2015 | |
| JP | 2015-075889 A | 4/2015 | |
| JP | 2015-138330 A | 7/2015 | |
| JP | 2016-000602 A | 1/2016 | |
| JP | 2016-011031 A | 1/2016 | |
| JP | 2016-071513 A | 5/2016 | |
| JP | 2016-151815 A | 8/2016 | |
| JP | 2016-196285 A | 11/2016 | |
| JP | 2016-207060 A | 12/2016 | |
| JP | 2017-062696 A | 3/2017 | |
| JP | 2017-100681 A | 6/2017 | |
| JP | 2017-134664 A | 8/2017 | |
| JP | 2017-138899 A | 8/2017 | |
| JP | 2017-165322 A | 9/2017 | |
| JP | 2017-210034 A | 11/2017 | |
| JP | 2017-217969 A | 12/2017 | |

(56) References Cited

FOREIGN PATENT DOCUMENTS

| | | |
|---|---|---|
| JP | 2018-047737 A | 3/2018 |
| JP | 2019-043169 A | 3/2019 |
| KR | 10-0578573 B2 | 5/2006 |
| KR | 10-2011-0065013 A | 6/2011 |
| KR | 10-2014-0082279 A | 7/2014 |
| KR | 10-1439017 B1 | 10/2014 |
| KR | 10-2016-0023850 A | 1/2016 |
| KR | 10-2016-0004835 A | 3/2016 |
| KR | 10-1779823 B | 10/2017 |
| KR | 10-2018-0022900 A | 3/2018 |
| KR | 10-2018-0023981 A | 3/2018 |
| KR | 10-2018-0070401 A | 6/2018 |
| KR | 2018-0095240 A | 8/2018 |
| WO | 2010-088869 A1 | 8/2010 |
| WO | 2012-131405 A1 | 10/2012 |
| WO | 2014-154771 A1 | 10/2014 |
| WO | 2017-018133 A1 | 2/2017 |
| WO | WO 2017064941 A1 | 4/2017 |
| WO | 2017-168013 A1 | 10/2017 |
| WO | WO 2017168013 A1 | 10/2017 |
| WO | 2018-033389 A1 | 2/2018 |
| WO | 2017-017793 A1 | 6/2018 |

OTHER PUBLICATIONS

European Search Report dated May 11, 2020 from the corresponding European Application No. 19167265.8, 9 pages.
Office Action for U.S. Appl. No. 16/204,400 dated Jun. 1, 2020, 44 pages.
Notice of Allowance for U.S. Appl. No. 16/204,362 dated Jul. 9, 2020, 21 pages.
European Search Report dated Mar. 27, 2020 from the corresponding European Application No. 19167264.1, 8 pages.
European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action dated Mar. 25, 2020 from the corresponding U.S. Appl. No. 16/204,362 , 27 pp.
U.S. Office Action dated Apr. 24, 2020 from the corresponding U.S. Appl. No. 16/203,884 , 25 pp.
Office Action dated Aug. 12, 2020 from the corresponding U.S. Appl. No. 16/192,279, 60 pages.
Notice of Allowance dated Sep. 4, 2020 from the corresponding U.S. Appl. No. 16/203,884, 15 pages.
Office Action dated Sep. 15, 2020 from the corresponding U.S. Appl. No. 16/206,170, 23 pages.
Office Action dated Dec. 10, 2020 from the corresponding U.S. Appl. No. 16/269,140, 31 pp.
Office Action dated Dec. 14, 2020 from the corresponding U.S. Appl. No. 16/378,203, 49 pp.
Notice of Allowance dated Dec. 28, 2020 from the corresponding U.S. Appl. No. 16/206,170, 16 pp.
Office Action dated Jan. 25, 2021 from the corresponding U.S. Appl. No. 16/192,279, 38 pp.
Notice of Allowance dated Jan. 25, 2021 from the corresponding U.S. Appl. No. 16/372,937, 31 pp.
Office Action dated Jan. 27, 2021 from the corresponding U.S. Appl. No. 16/299,547, 29 pp.
Office Action dated Feb. 11, 2021 from the corresponding U.S. Appl. No. 16/372,896, 26 pp.
Office Action dated Feb. 11, 2021 from the corresponding U.S. Appl. No. 16/376,661, 24 pp.
Office Action dated Feb. 17, 2021 from the corresponding U.S. Appl. No. 16/204,324, 30 pp.
Office Action dated Mar. 17, 2021 from the corresponding U.S. Appl. No. 16/378,181, 14 pp.
Notice of Allowance dated Mar. 23, 2021 from the corresponding U.S. Appl. No. 16/269,140, 9 pp.
Office Action dated Mar. 26, 2021 from the corresponding U.S. Appl. No. 16/376,612, 29 pp.
Office Action dated Apr. 15, 2021 from the corresponding U.S. Appl. No. 16/290,376, 27 pp.
Office Action dated Apr. 22, 2021 from the corresponding U.S. Appl. No. 16/378,203, 35 pp.
Notice of Allowance dated May 19, 2021 from the corresponding U.S. Appl. No. 16/204,324, 13 pp.
Office Action dated May 21, 2021 from the corresponding U.S. Appl. No. 16/372,896, 19 pp.
Notice of Allowance dated May 27, 2021 from the corresponding U.S. Appl. No. 16/376,661, 10 pp.
Office Action dated Jun. 1, 2021 from the corresponding U.S. Appl. No. 16/192,279, 39 pp.
U.S. Appl. No. 16/290,376, filed Mar. 1, 2019.
U.S. Appl. No. 16/299,547, filed Mar. 12, 2019.
U.S. Appl. No. 16/367,433, filed Mar. 28, 2019.
U.S. Appl. No. 16/372,896, filed Apr. 2, 2019.
U.S. Appl. No. 16/372,966, filed Apr. 2, 2019.
U.S. Appl. No. 16/378,181, filed Apr. 8, 2019.
U.S. Appl. Nos. 16/192,279 and 17/090,578.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
U.S. Office Action for U.S. Appl. No. 16/204,362 dated Oct. 16, 2019, 32 pages.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
U.S. Appl. No. 16/378,203, filed Apr. 8, 2019.
U.S. Appl. No. 16/376,612, filed Apr. 5, 2019.

\* cited by examiner

APPARATUS AND METHOD FOR CONTROLLING TO ENABLE AUTONOMOUS SYSTEM IN VEHICLE

CROSS-REFERENCE TO RELATED APPLICATION

The present application claims priority to and the benefit of Korean Patent Application No. 10-2018-0163249, filed on Dec. 17, 2018, which claims priority to and the benefit of U.S. Patent Application No. 62/655,831, filed on Apr. 11, 2018, the entire contents of which are incorporated herein by reference.

TECHNICAL FIELD

The present disclosure relates to an apparatus and method for controlling to enable an autonomous system included in an autonomous vehicle.

BACKGROUND

The statements in this section merely provide background information related to the present disclosure and may not constitute prior art.

With the development of the auto industry, an autonomous system and a driving assistance system which facilitates partially autonomous driving (hereinafter, for convenience of description, both of autonomous driving and driving assistance are referred to as "autonomous driving") have been developed. The autonomous system may provide a variety of functions, for example, setting speed keeping, vehicle-to-vehicle distance keeping, lane keeping, and a lane change. The autonomous system may perform autonomous driving using various devices such as a sensor for sensing environments outside the vehicle, a sensor for sensing information about the vehicle, a global positioning system (GPS), a detailed map, a driver state monitoring system, a steering actuator, an acceleration/deceleration actuator, a communication circuit, and a control circuit (e.g., an electronic control unit (ECU)). The autonomous system may be enabled according to an input of a driver. When a problem occurs or when the occurrence of the problem is predicted, the autonomous system may provide a notification of control authority transition to the driver. When the driver takes over control authority, the autonomous system may be released.

When the autonomous system is released due to the occurrence of a critical situation, after the critical situation is solved, the driver should provide an input for enabling the autonomous system again. There are various critical situations during autonomous driving. Whenever a critical situation occurs, after the autonomous system is released, when the vehicle requests the driver to provide an input for re-enabling the autonomous system, the driver may suffer from inconveniences. However, when the vehicle randomly enables the autonomous system without the input of the driver, the autonomous system may be enabled against the will of the driver.

SUMMARY

An aspect of the present disclosure provides an apparatus and method for selectively restarting an autonomous system when a critical situation is solved after the autonomous system is released due to the critical situation.

The technical problems to be solved by the present inventive concept are not limited to the aforementioned problems, and any other technical problems not mentioned herein will be clearly understood from the following description by those skilled in the art to which the present disclosure pertains.

In one aspect of the present disclosure, an apparatus for controlling to enable an autonomous system in a vehicle may include: a sensor configured to sense information about the outside and inside of the vehicle, an input device configured to receive an input from a driver of the vehicle, an output device configured to output a notification in the vehicle, and a control circuit configured to be electrically connected with the sensor, the input device, and the output device. The control circuit may be configured to enable autonomous control in response to an input of the driver to the input device, detect a critical situation for the vehicle using the sensor, output a notification of control authority transition using the output device in response to the detecting of the critical situation, and automatically re-enable the autonomous control when the critical situation is solved after temporarily releasing the autonomous control, when the critical situation corresponds to a critical situation of a specified type.

In some form of the present disclosure, the control circuit may be configured to output a fist type of notification using the output device, when the critical situation corresponds to the critical situation of the specified type and output a second type of notification using the output device, when the critical situation does not correspond to the critical situation of the specified type.

In some form of the present disclosure, critical situation of the specified type may include at least a portion of prediction of temporary departure from an operational design domain (ODD) of the autonomous control, detection of driver distraction, detection of steering control of less than or equal to a specified level by the driver, or detection of acceleration control of less than or equal to a specified level by the driver.

In some form of the present disclosure, the control circuit may be configured to predict the temporary departure based on traveling route information and map information.

In some form of the present disclosure, the control circuit may be configured to detect the driver distraction by monitoring whether the driver looks ahead of the vehicle using the sensor.

In some form of the present disclosure, the control circuit may be configured to detect the steering control by monitoring movement of a steering wheel included in the vehicle.

In some form of the present disclosure, the control circuit may be configured to detect the acceleration control by monitoring movement of an accelerator pedal included in the vehicle.

In some form of the present disclosure, the control circuit may be configured to temporarily release the autonomous control, when the critical situation corresponds to the critical situation of the specified type and when control authority is handed over to the driver.

In some form of the present disclosure, the control circuit may be configured to output a first type of notification in response to the detecting of the critical situation, when the critical situation corresponds to the critical situation of the specified type and output a second type of notification, when control authority is not handed over to the driver during a specified time after the first type of notification is output.

In some form of the present disclosure, the control circuit may be configured to release the autonomous control, when the critical situation does not correspond to the critical situation of the specified type, maintain the state where the autonomous control is released, when the critical situation is solved, and re-enable the autonomous control only when an input of the driver to the input device is detected again.

In some form of the present disclosure, the control circuit may be configured to release the autonomous control, when the critical situation does not correspond to the critical situation of the specified type and when control authority is handed over to the driver.

In some form of the present disclosure, the control circuit may be configured to control the vehicle according to a predetermined minimum risk maneuver (MRM), when control authority is not handed over to the driver during a specified time after the notification of the control authority transition is output.

In some form of the present disclosure, a method for controlling to enable an autonomous system in a vehicle may include: enabling autonomous control in response to an input of a driver of the vehicle to an input device included in the vehicle, detecting a critical situation for the vehicle, outputting a notification of control authority transition in the vehicle in response to the detecting of the critical situation, and automatically re-enabling the autonomous control when the critical situation is solved after temporarily releasing the autonomous control, when the critical situation corresponds to a critical situation of a specified type.

In some form of the present disclosure, the re-enabling may include temporarily releasing the autonomous control, when the critical situation corresponds to the critical situation of the specified type and when control authority is handed over to the driver.

In some form of the present disclosure, the method may further include releasing the autonomous control, when the critical situation does not correspond to the critical situation of the specified type, maintaining the state where the autonomous control is released, when the critical situation is solved, and re-enabling the autonomous control only when an input of the driver to the input device is detected again.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
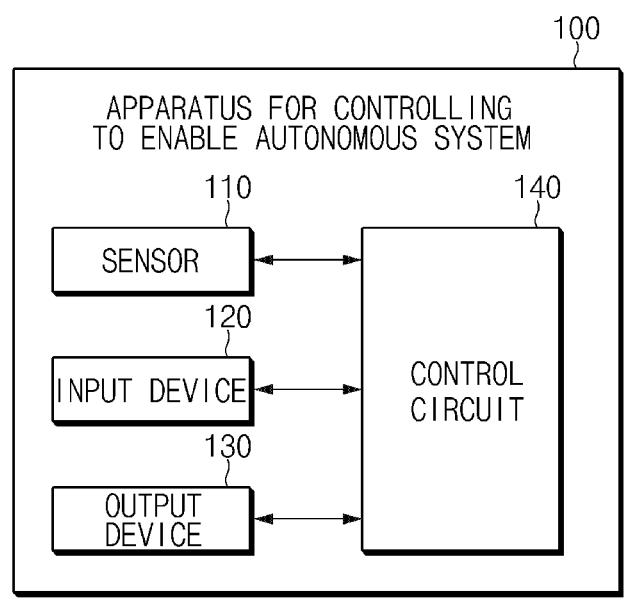
FIG. 1 is a block diagram illustrating a configuration of an apparatus for controlling to enable an autonomous system in a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing elements of forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for controlling to enable an autonomous system in a vehicle in some forms of the present disclosure.

Referring to FIG. 1, an apparatus 100 for controlling to enable an autonomous system in a vehicle in some forms of the present disclosure may include a sensor 110, an input device 120, an output device, and a control circuit 140. The apparatus 100 for controlling to enable the autonomous system in FIG. 1 may be a portion of the autonomous system and may be loaded into the vehicle.

The sensor 110 may be configured to sense information about the outside and inside of the vehicle. For example, the sensor 110 may include a radar, a light detection and ranging (LiDAR), a camera, and the like for sensing an environment outside the vehicle, and may include a wheel speed sensor, a yaw rate sensor, an acceleration sensor, a torque sensor, and the like, which sense a state of the vehicle.

The input device 120 may be configured to receive an input from a driver of the vehicle. For example, the input device 120 may be implemented as a button, a switch, a lever, a touch sensor, or the like.

The output device 130 may be configured to output a notification in the vehicle. For example, the output device 130 may be implemented in a form, such as a speaker, a haptic module, and a display, which is capable of outputting a notification sensuously recognizable by the driver.

The control circuit 140 may be electrically connected with the sensor 110, the input device 120, and the output device 130. The control circuit 140 may control the sensor 110, the input device 120, and the output device 130 and may perform a variety of data processing and various arithmetic operations. The control circuit 140 may be, for example, an electronic control unit (ECU), a micro controller unit (MCU), or a sub-controller, which is loaded into the vehicle.

In some forms of the present disclosure, the control circuit 140 may enable autonomous control in response to an input of the driver to the input device 120. When the driver provides an input to the input device 120 to enable the autonomous control, the control circuit 140 may initiate the autonomous control.

In some forms of the present disclosure, the control circuit 140 may detect a critical situation for the vehicle using the sensor 110. The critical situation may include situations, for example, departure from an operational design domain (ODD) of the autonomous control, driver distraction, steering control by the driver, acceleration control by the driver, deceleration control by the driver, collision risk detection, a system failure, and the like.

In some forms of the present disclosure, the control circuit 140 may output a notification of control authority transition using the output device 130 in response to the detecting of the critical situation. The control circuit 140 may output a notification to hand over control authority to the driver in response to the critical situation. In some forms of the present disclosure, when the critical situation corresponds to a critical situation of a specified type, the control circuit 140 may output a first type of notification using the output device 130. When the critical situation does not correspond to the critical situation of the specified type, the control circuit 140 may output a second type of notification using the output device 130. The critical situation of the specified type may be a situation with relatively low risk, and a critical situation of a type except for the specified type may be a situation with relatively high risk.

In some forms of the present disclosure, the control circuit 140 may determine whether the critical situation corresponds to the critical situation of the specified type. For example, the critical situation of the specified type may include at least a portion of prediction (e.g., a tollgate) of temporary departure from the ODD of the autonomous control, detection of driver distraction, detection of steering control of less than or equal to a specified level by the driver, or detection of acceleration control of less than or equal to a specified level by the driver. For example, the control circuit 140 may predict the temporary departure based on information about a route where the vehicle is traveling and map information. For another example, the control circuit 140 may detect the driver distraction by monitoring whether the driver looks ahead of the vehicle using the sensor 110. For another example, the control circuit 140 may detect the steering control by monitoring movement of a steering wheel included in the vehicle. For another example, the control circuit 140 may detect the acceleration control by monitoring movement of an accelerator pedal included in the vehicle. The critical situation of the type except for the specified type may be another critical situation except for the critical situation of the specified type. For example, the critical situation of the type except for the specified type may include when control authority is not handed over to the driver in response to a first-stage notification, when departure from the ODD of the autonomous control is predicted (e.g., when the vehicle enters a normal road), when drowsiness of the driver is detected, when steering control of greater than or equal to a specified level is performed by the driver, when acceleration control of greater than or equal to a specified level is performed by the driver, when deceleration control is performed by the driver, when accident (e.g., collision) risk is detected, when a system failure is detected, and the like.

In some forms of the present disclosure, when the critical situation corresponds to the critical situation of the specified type, the control circuit 140 may temporarily release the autonomous control and may automatically re-enable the autonomous control when the critical situation is solved. In detail, when the critical situation corresponds to the critical situation of the specified type, the control circuit 140 may output the first type of notification in response to the detecting of the critical situation. When control authority is handed over to the driver while the notification is output, the control circuit 140 may temporarily release the autonomous control. After the autonomous control is released, when the critical situation is solved, the control circuit 140 may automatically re-enable the autonomous control. Thus, in a situation with relatively low risk, the autonomous control may be automatically enabled without an input of the driver.

In some forms of the present disclosure, when control authority is not handed over to the driver during a specified time after the first type of notification is output, the control circuit 140 may output a second type of notification. When outputting the second type of notification, the control circuit 140 may proceed with a subsequent process to be the same as when the critical situation does not correspond to the critical situation of the specified type.

In some forms of the present disclosure, when the critical situation does not correspond to the critical situation of the specified type, the control circuit 140 may release the autonomous control and may maintain the state where the autonomous control is released when the critical situation is solved, thus re-enabling the autonomous control only when an input of the driver to the input device 120 is detected again. In detail, when the critical situation does not correspond to the critical situation of the specified type, the control circuit 140 may output the second type of notification. When control authority is handed over to the driver while the notification is output, the control circuit 140 may release the autonomous control. After the autonomous control is released, although the critical situation is solved, the control circuit 140 may maintain the state where the autonomous control is released, without enabling the autonomous control. Only when the driver requests the vehicle to enable the autonomous control depending on the will of the driver, the control circuit 140 may re-enable the autonomous control.

In some forms of the present disclosure, when the critical situation does not correspond to the critical situation of the specified type and when control authority is not handed over to the driver during a specified time after the notification of control authority is output, the control circuit 140 may control the vehicle according to a predetermined MRM.

Figure 2:
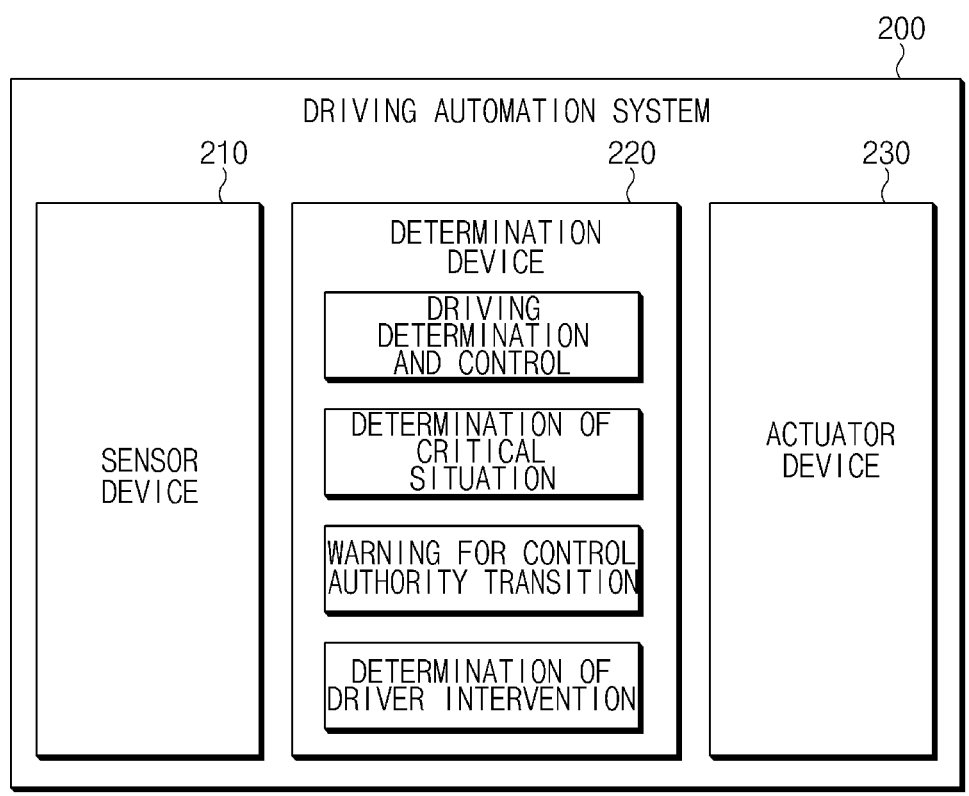
FIG. 2 is a block diagram illustrating a configuration of an apparatus for controlling to enable an autonomous system in a vehicle in one form of the present disclosure.

FIG. 2 is a block diagram illustrating a configuration of an apparatus for controlling to enable an autonomous system in a vehicle in some forms of the present disclosure.

Referring to FIG. 2, a driving automation system 200 in some forms of the present disclosure may include a sensor device 210, a determination device 220, and an actuator device 230.

The sensor device 210 may recognize a driving environment. For example, the sensor device 210 may include a sensor (e.g., a radar, a light detection and ranging (LiDAR), a camera, and the like) which recognizes an environment around the vehicle and a vehicle sensor (e.g., a wheel speed sensor, a yaw rate sensor, and the like) which measures a state inside the vehicle. The sensor device 210 may include a detailed map or the like for performing a search for a destination and accurate position estimation.

The determination device 220 may calculate various determination and control command values for operating the driving automation system 200. The determination device 220 may be, for example, an ECU. The determination device 220 may perform driving determination and control, determination of a critical situation, a warning for control authority transition, determination of driver intervention, and the like. For example, the determination device 220 may determine a critical situation incapable of being avoided, based on the recognized situation around the vehicle and the calculated control command value. For another example, the determination device 220 may determine a stage of the warning for control authority transition. The warning may include a first-stage warning and a second-stage warning. The warning may be configured to be sensuously recognizable by the driver. For another example, the determination device 220 may recognize driver intervention and may determine whether to release the driving automation system 200.

The actuator device 230 may control a behavior of the vehicle. The actuator device 230 may include an ECU for motor control, capable of automatically controlling a steering wheel of the vehicle, and an ECU for motor control, capable of automatically controlling a throttle and a brake of the vehicle. The actuator device 230 may include an actuator for controlling the steering wheel, the throttle, and the brake.

Figure 3:
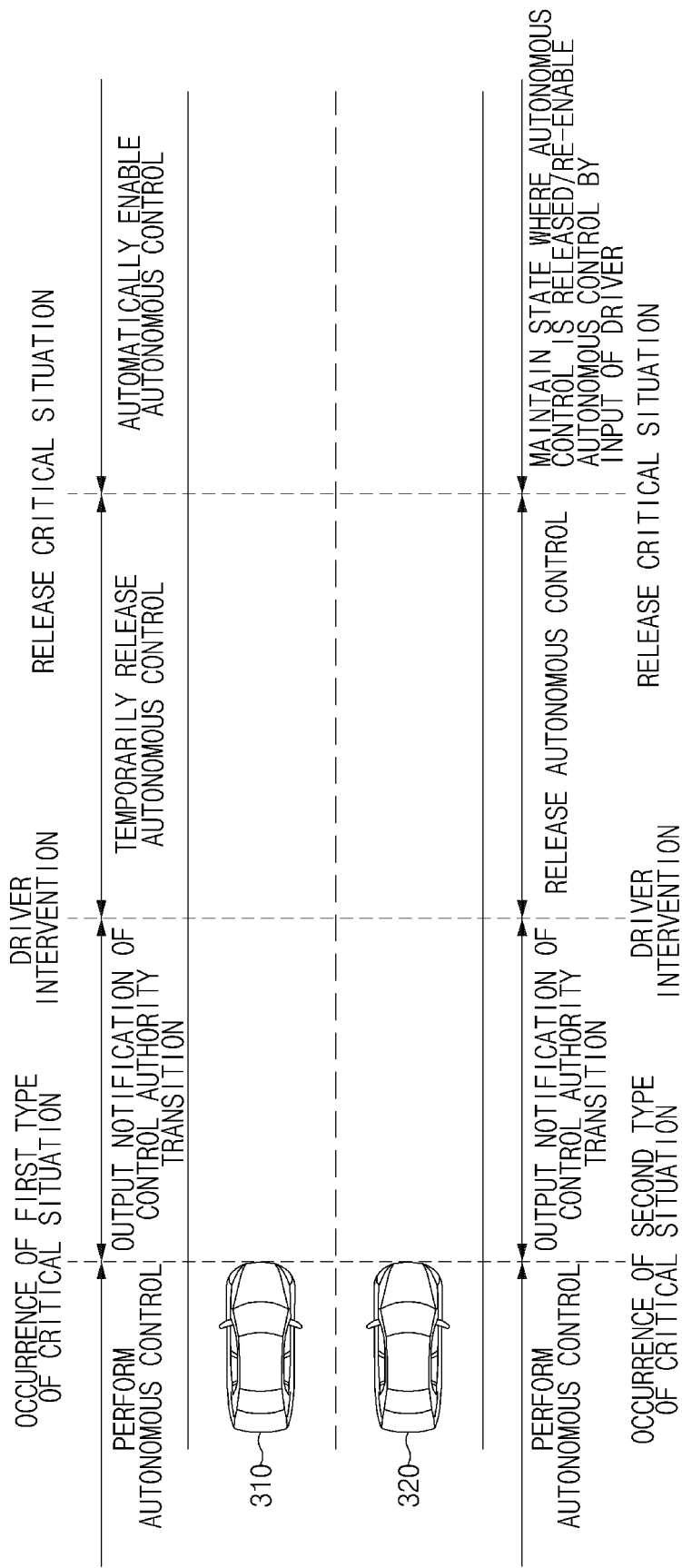
FIG. 3 is a drawing illustrating an exemplary operation of an apparatus for controlling to enable an autonomous system in a vehicle in one form of the present disclosure.

FIG. 3 is a drawing illustrating an exemplary operation of an apparatus for controlling to enable an autonomous system in a vehicle in some forms of the present disclosure.

Referring to FIG. 3, a vehicle 310 according to an form may perform autonomous control. While the autonomous control is performed, the vehicle 310 may detect a first type of critical situation. The first type of critical situation may be a situation with relatively low risk. The vehicle 310 may output a notification (a first-stage notification) for handing over control authority to its driver. When a steering input, an accelerator pedal input, and a decelerator pedal input occur, the vehicle 310 may determine that driver intervention is detected. When the driver intervention is detected, the vehicle 310 may temporarily release the autonomous control. Subsequently, when the critical situation is released, the vehicle 310 may automatically re-enable the autonomous control.

A vehicle 320 in some forms of the present disclosure may perform autonomous control. While the autonomous control is performed, the vehicle 320 may detect a second type of critical situation. The second type of critical situation may be a situation with relatively high risk. The vehicle 320 may output a notification (a second-stage notification) for handing over control authority to its driver. When a steering input, an accelerator input, and a decelerator input occur, the vehicle 320 may determine that driver intervention is detected. When the driver intervention is detected, the vehicle may release the autonomous control. When the second-stage notification is output, although the critical situation is released at a later time, the vehicle 320 may maintain the state where the autonomous control is released. In this case, the autonomous control may be re-enabled by only an input of the driver.

Figure 4:
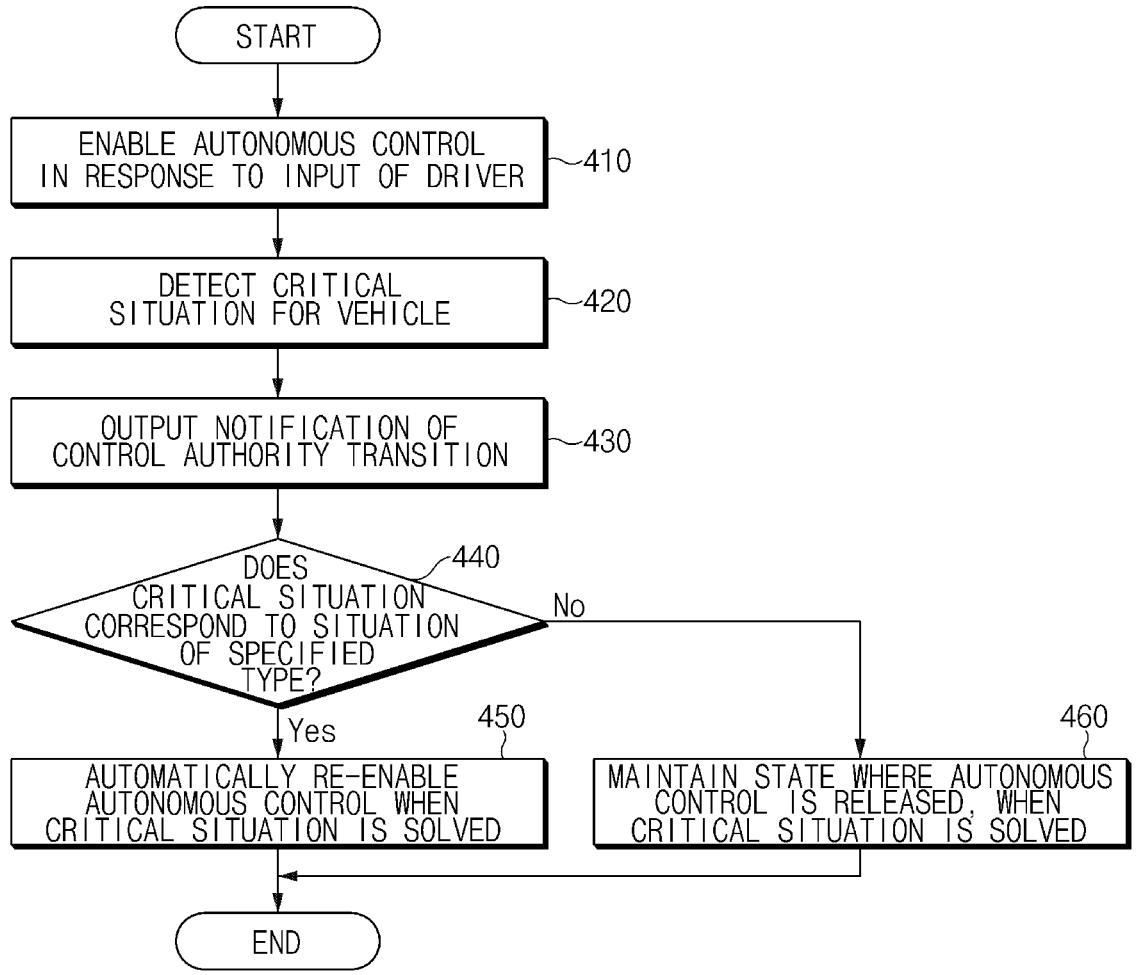
FIG. 4 is a flowchart illustrating a method for controlling to enable an autonomous system in a vehicle in one form of the present disclosure.

FIG. 4 is a flowchart illustrating a method for controlling to enable an autonomous system in a vehicle in some forms of the present disclosure.

Hereinafter, it is assumed that a vehicle including an apparatus 100 for controlling to enable an autonomous system in FIG. 1 performs a process of FIG. 4. Furthermore, in a description of FIG. 4, an operation described as being performed by the vehicle may be understood as being controlled by a control circuit 140 of the apparatus 100 for controlling to enable the autonomous system.

Referring to FIG. 4, in operation 410, the vehicle may enable autonomous control in response to an input of its driver. For example, when an input of the driver to a button of the vehicle is received, the vehicle may initiate the autonomous control.

In operation 420, the vehicle may detect a critical situation for the vehicle. For example, the vehicle may detect the critical situation based on data generated by its sensor and information obtained from the inside of the vehicle.

In operation 430, the vehicle may output a notification of control authority transition. For example, the vehicle may output a sensuously sensible notification to hand over control authority to the driver.

In operation 440, the vehicle may determine whether the critical situation corresponds to a critical situation of a specified type. For example, the vehicle may determine whether the critical situation corresponds to a specified situation with relative low risk.

When the critical situation corresponds to the critical situation of the specified type, in operation 450, the vehicle may automatically re-enable the autonomous control when the critical situation is solved. For example, as control authority is handed over to the driver, after the autonomous control is released, when the critical situation is solved, the vehicle may automatically re-enable the autonomous control for convenience of the driver.

When the critical situation does not correspond to the critical situation of the specified type, in operation 460, the vehicle may maintain the state where the autonomous control is released, when the critical situation is solved. For example, as control authority is handed over to the driver, after the autonomous control is released, although the critical situation is solved, the vehicle may fail to enable the autonomous control for safety of the driver.

Figure 5:
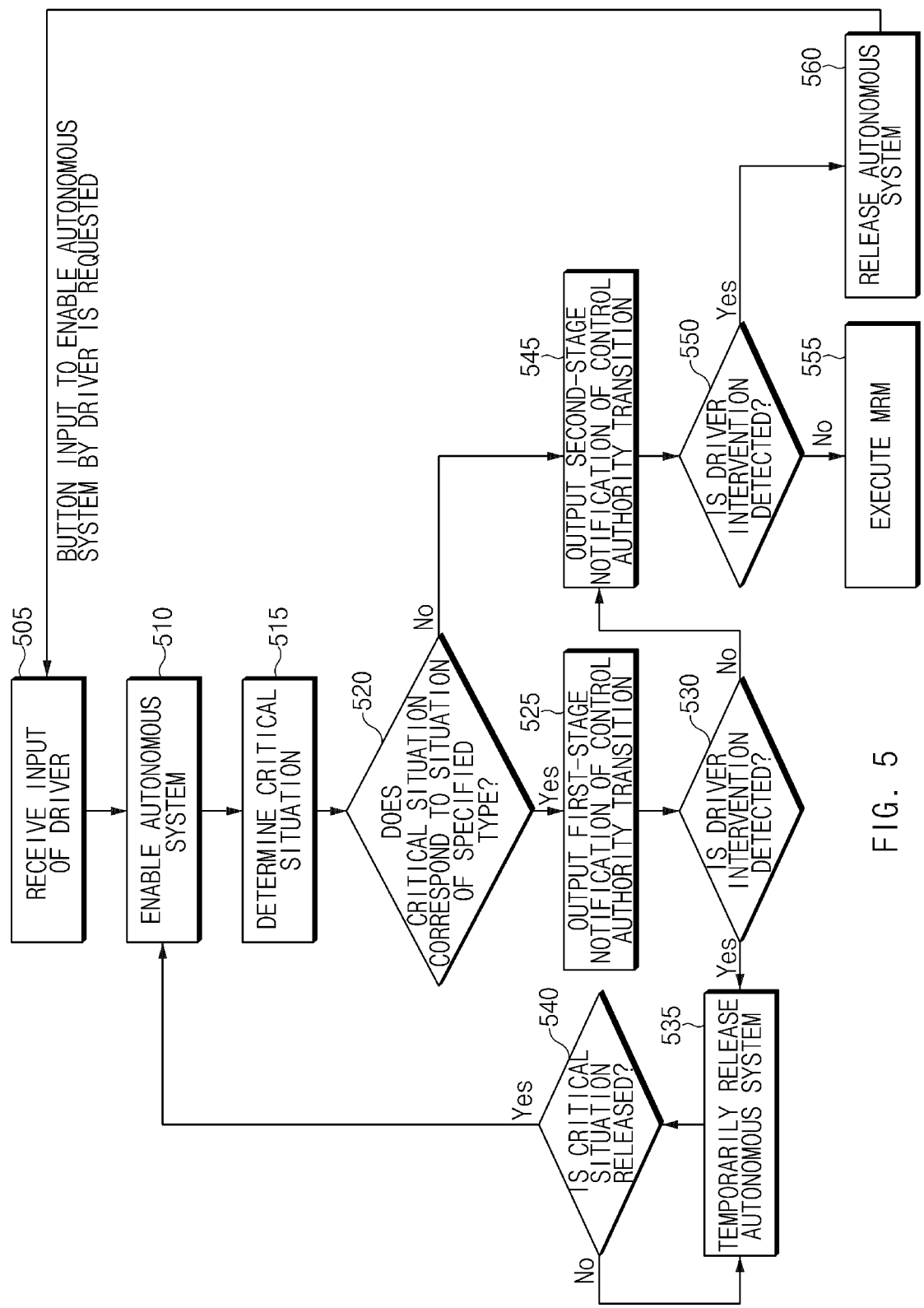
FIG. 5 is a flowchart illustrating a method for controlling to enable an autonomous system in a vehicle in one form of the present disclosure.

FIG. 5 is a flowchart illustrating a method for controlling to enable an autonomous system in a vehicle in some forms of the present disclosure.

Hereinafter, it is assumed that a vehicle including an apparatus 100 for controlling to enable an autonomous system in FIG. 1 performs a process of FIG. 5. Furthermore, in a description of FIG. 5, an operation described as being performed by the vehicle may be understood as being controlled by a control circuit 140 of the apparatus 100 for controlling to enable the autonomous system.

Referring to FIG. 5, in operation 505, the vehicle may receive an input of its driver. For example, the vehicle may receive an input of the driver to a button for enabling a driving automation system. In operation 510, the vehicle may enable an autonomous system. The autonomous system may be enabled in consideration of an enabling condition of a system (e.g., in case of a system available on a limited-access road, when the vehicle travels on the limited-access road). In operation 515, the vehicle may determine a critical situation. The vehicle may detect a situation incapable of being controlled by the autonomous system. In operation 520, the vehicle may determine whether the detected critical situation corresponds to a critical situation of a specified type.

When the detected critical situation corresponds to the critical situation of the specified type, in operation 525, the vehicle may output a first-stage notification of control authority transition. In operation 530, the vehicle may detect driver intervention. When the driver intervention is detected, in operation 535, the vehicle may temporarily release the autonomous system. In operation 540, the vehicle may determine whether the critical situation is solved. When the critical situation is solved, the vehicle may return to operation 510 to automatically enable the autonomous system.

When the detected critical situation does not correspond to the critical situation of the specified type or when there is no driver intervention after the first-stage notification occurs, in operation 545, the vehicle may output a second-stage notification of control authority transition. In operation 550, the vehicle may detect driver intervention. When the driver intervention is not detected, in operation 555, the vehicle may execute an MRM. When the driver intervention is detected, in operation 560, the vehicle may release the autonomous system. After operation 560, the vehicle may fail to automatically enable the autonomous system, and may enable the autonomous system only when an input of the driver to a button of the vehicle or the like is received.

Figure 6:
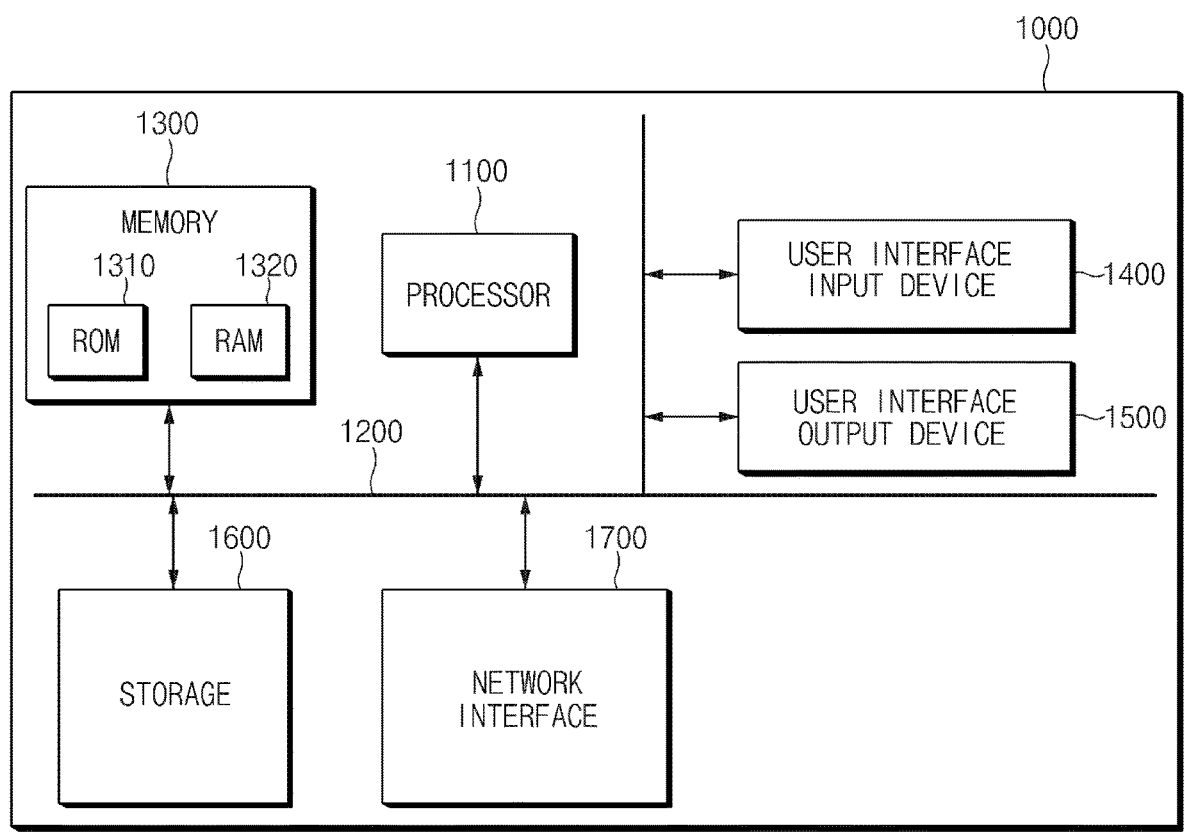
FIG. 6 is a block diagram illustrating a configuration of a computing system in one form of the present disclosure.

FIG. 6 is a block diagram illustrating a configuration of a computing system in some forms of the present disclosure.

Referring to FIG. 6, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for performing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in some forms of the present disclosure disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus and method in some forms of the present disclosure may reduce inconvenience of the driver due to the release of the autonomous system and may decrease risk due to automatically enabling the system by automatically re-enabling autonomous control in consideration of a type of a critical situation.

In addition, various effects directly or indirectly ascertained through the present disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for controlling to enable an autonomous system in a vehicle, the apparatus comprising:
   a sensor configured to sense information regarding an outside of the vehicle and an inside of the vehicle;
   an input device configured to receive an input from a driver of the vehicle;
   an output device configured to output a notification in the vehicle; and
   a control circuit configured to be electrically connected with the sensor, the input device, and the output device, wherein the control circuit is configured to:
   activate an autonomous control in response to the received input;
   detect a critical situation of the vehicle by the sensor;
   output a notification to transfer a control authority by the output device in response to the detected critical situation; and
   automatically reactivate the autonomous control when the critical situation is solved after temporarily releasing the autonomous control, wherein the critical situation of the vehicle corresponds to a critical situation of a specified type having a lower risk than a predetermined level of risk, and
   wherein the critical situation of the specified type comprises at least one of:
   prediction of temporary departure from an operational design domain (ODD) of the autonomous control;
   detection of driver distraction;
   detection of steering control by the driver for less than or equal to a specified level; or
   detection of acceleration control by the driver for less than or equal to the specified level, and
   wherein the control circuit is configured to:
   release the autonomous control when the critical situation does not correspond to the critical situation of the specified type;
   maintain releasing the autonomous control when the critical situation is solved; and
   reactivate the autonomous control only when the input is detected again.

2. The apparatus of claim 1, wherein the control circuit is configured to:
   output a first type of notification by the output device when the critical situation corresponds to the critical situation of the specified type; and
   output a second type of notification by the output device when the critical situation does not correspond to the critical situation of the specified type.

3. The apparatus of claim 1, wherein the control circuit is configured to:
   predict the temporary departure based on traveling route information and map information.

4. The apparatus of claim 1, wherein the control circuit is configured to:
   detect the driver distraction by monitoring whether the driver looks ahead of the vehicle using the sensor.

5. The apparatus of claim 1, wherein the control circuit is configured to:
   detect the steering control by monitoring a movement of a steering wheel.

6. The apparatus of claim 1, wherein the control circuit is configured to:
   detect the acceleration control by monitoring a movement of an accelerator pedal.

7. The apparatus of claim 1, wherein the control circuit is configured to:
   temporarily release the autonomous control, when the critical situation corresponds to the critical situation of the specified type and when the control authority is transferred to the driver.

8. The apparatus of claim 1, wherein the control circuit is configured to:
   output a first type of notification in response to the detected critical situation when the critical situation corresponds to the critical situation of the specified type; and output a second type of notification when the control authority is not transferred to the driver for a predetermined amount of time after outputting the first type of notification.

9. The apparatus of claim 1, wherein the control circuit is configured to:
release the autonomous control when the critical situation does not correspond to the critical situation of the specified type and when the control authority is transferred to the driver.

10. The apparatus of claim 1, wherein the control circuit is configured to:
control the vehicle based on a predetermined minimum risk maneuver (MRM) when the control authority is not transferred to the driver for the predetermined amount of time after outputting the notification to transfer the control authority.

11. A method for controlling to enable an autonomous system in a vehicle, the method comprising:
activating, with a control circuit included in the vehicle, an autonomous control in response to an input of a driver of the vehicle to an input device included in the vehicle;
detecting, with a sensor included in the vehicle, a critical situation of the vehicle;
outputting, with an output device included in the vehicle, a notification to transfer a control authority in the vehicle in response to the detected critical situation; and
automatically reactivating, with the control circuit, the autonomous control when the critical situation is solved after temporarily releasing the autonomous control,
wherein the critical situation of the vehicle corresponds to a critical situation of a specified type having a lower risk than a predetermined level of risk, and
wherein the critical situation of the specified type comprises at least one of:
prediction of temporary departure from an operational design domain (ODD) of the autonomous control;
detection of driver distraction;
detection of steering control by the driver for less than or equal to a specified level; or
detection of acceleration control by the driver for less than or equal to the specified level,
wherein the method further comprises:
when the critical situation does not correspond to the critical situation of the specified type, releasing, with the control circuit, the autonomous control;
when the critical situation is solved, maintaining, with the control circuit, releasing the autonomous control; and
reactivating, with the control circuit, the autonomous control only when the input of the driver is detected again.

12. The method of claim 11, wherein reactivating the autonomous control further comprises:
when the critical situation corresponds to the critical situation of the specified type and when the control authority is transferred to the driver, temporarily releasing, with the control circuit, the autonomous control.

* * * * *